US012249240B2

United States Patent
Kurehashi et al.

(10) Patent No.: US 12,249,240 B2
(45) Date of Patent: Mar. 11, 2025

(54) COMMUNICATION DEVICE, VEHICLE, COMPUTER-READABLE STORAGE MEDIUM, AND COMMUNICATION METHOD

(71) Applicant: HONDA MOTOR CO., LTD., Tokyo (JP)

(72) Inventors: Takahiro Kurehashi, Saitama (JP); Shigeru Inoue, Saitama (JP); Yasuaki Gunji, Saitama (JP); Hiroshi Furumi, Saitama (JP); Yasuhiro Miyachi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 17/897,231

(22) Filed: Aug. 29, 2022

(65) Prior Publication Data

US 2022/0406190 A1 Dec. 22, 2022

Related U.S. Application Data

(63) Continuation of application No. PCT/JP2020/009000, filed on Mar. 3, 2020.

(51) Int. Cl.
*G08G 1/16* (2006.01)
*G06V 20/58* (2022.01)
(Continued)

(52) U.S. Cl.
CPC ............. *G08G 1/16* (2013.01); *G06V 20/58* (2022.01); *G08G 1/164* (2013.01); *G08G 1/166* (2013.01);
(Continued)

(58) Field of Classification Search
CPC .... G08G 1/00; G08G 1/052; G08G 1/096791; G08G 1/123; G08G 1/16; G08G 1/163;
(Continued)

(56) References Cited

U.S. PATENT DOCUMENTS

2016/0071418 A1* 3/2016 Oshida ............... B60W 30/165
701/23
2017/0101054 A1* 4/2017 Dusane ............ G08G 1/096741
(Continued)

FOREIGN PATENT DOCUMENTS

| CN | 107924630 A | 4/2018 |
| CN | 110853361 A | 2/2020 |

(Continued)

OTHER PUBLICATIONS

NPL Search (Dec. 12, 2023).*
(Continued)

*Primary Examiner* — Van T Trieu

(57) ABSTRACT

A communication device includes a target locating unit configured to locate a position of a target having a risk of approaching a moving body. The communication device includes a transmission unit configured to transmit request information including positional information of an external terminal, for which the positional information is requested, based on the position of the target located by the target locating unit. The communication device includes a reception unit configured to receive response information with respect to the request information. The transmission unit is configured to transmit warning information based on the positional information of the external terminal included in the response information.

21 Claims, 9 Drawing Sheets

(51) Int. Cl.
  *G01S 13/08* (2006.01)
  *G01S 13/931* (2020.01)
  *H04W 4/02* (2018.01)
  *H04W 4/06* (2009.01)
  *H04W 4/90* (2018.01)

(52) U.S. Cl.
  CPC ............ *G01S 13/08* (2013.01); *G01S 13/931* (2013.01); *H04W 4/027* (2013.01); *H04W 4/06* (2013.01); *H04W 4/90* (2018.02)

(58) Field of Classification Search
  CPC .......... G08G 1/166; G01G 1/005; G05D 1/00; G05D 1/02
  See application file for complete search history.

(56) References Cited

U.S. PATENT DOCUMENTS

| | | | |
|---|---|---|---|
| 2017/0243485 A1* | 8/2017 | Rubin | H04W 4/46 |
| 2018/0208140 A1 | 7/2018 | Sugimoto | |
| 2019/0318625 A1* | 10/2019 | Morimura | G08G 1/123 |
| 2020/0064826 A1* | 2/2020 | Engle | G05D 1/0246 |
| 2020/0066150 A1 | 2/2020 | Katayama | |
| 2022/0198930 A1* | 6/2022 | Ookuma | G08G 1/04 |

FOREIGN PATENT DOCUMENTS

| | | |
|---|---|---|
| JP | 2006163637 A | 6/2006 |
| JP | 2007223517 A | 9/2007 |
| JP | 2008225572 A | 9/2008 |
| JP | 5862777 B2 | 2/2016 |
| JP | 2017027525 A | 2/2017 |
| JP | 2017156844 A | 9/2017 |
| JP | 2019041354 A | 3/2019 |
| JP | 2019194909 A | 11/2019 |

OTHER PUBLICATIONS

International Preliminary Report on Patentability for International Application No. PCT/JP2020/009000, issued by the International Bureau of WIPO on Sep. 6, 2022.

Office Action issued for counterpart Chinese Application 202080095423.X, issued by the State Intellectual Property Office of People's Republic of China on Apr. 27, 2023.

* cited by examiner

| CATEGORY | VELOCITY [km/s] | TRANSMISSION METHOD |
|---|---|---|
| PEDESTRIAN | $0 < V \leqq 2$ | METHOD 1 |
| PEDESTRIAN | $2 < V \leqq 5$ | METHOD 2 |
| ... | ... | ... |
| AUTOMOBILE | $0 < V \leqq 5$ | METHOD 1 |
| AUTOMOBILE | $5 < V \leqq 30$ | METHOD 2 |
| ... | ... | ... |

FIG.7

COMMUNICATION DEVICE, VEHICLE, COMPUTER-READABLE STORAGE MEDIUM, AND COMMUNICATION METHOD

The contents of the following international patent application(s) are incorporated herein by reference:
NO. PCT/JP2020/009000 filed on Mar. 3, 2020.

BACKGROUND

1. Technical Field

The present invention relates to a communication device, a vehicle, a computer-readable storage medium, and a communication method.

2. Related Art

Patent Document 1 describes "a communication terminal for a vehicle that transmits search signals and receives response signals". Patent Document 2 describes that " . . . a road, . . . and a traverser are detected from an image captured by an in-vehicle camera". Patent Document 3 describes "an image recognition means to recognize a pedestrian from an image around a vehicle".

PRIOR ART DOCUMENTS

Patent Documents

Patent Document 1: Japanese Patent Application Publication No. 2017-27525
Patent Document 2: Japanese Patent Application Publication No. 2019-194909
Patent Document 3: Japanese Patent Application Publication No. 2006-163637

BRIEF DESCRIPTION OF THE DRAWINGS

FIG. 7 shows a data structure of transmission method information referred to by a communication control unit 270 to specify a transmission method.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention.

Figure 1:
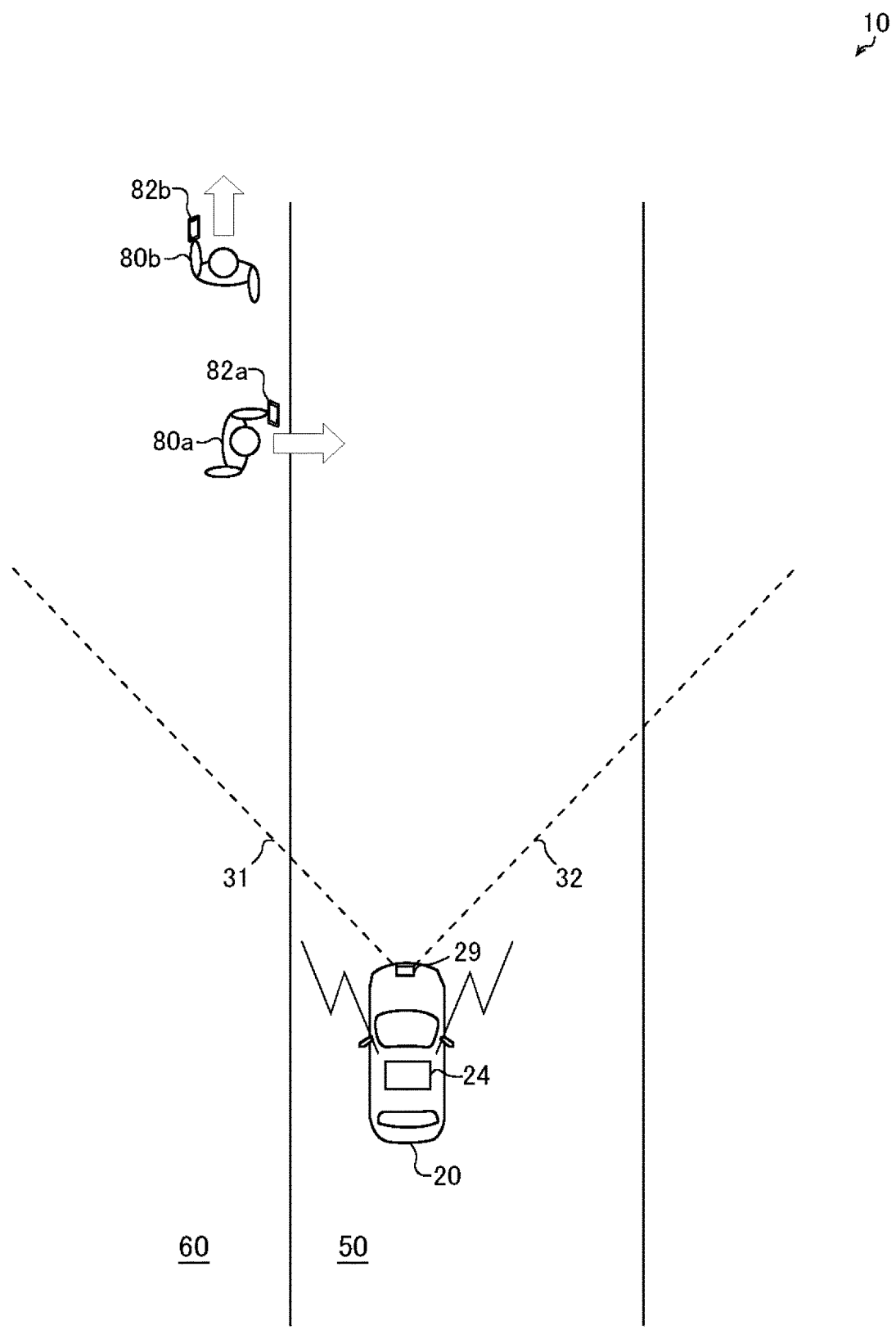
FIG. 1 schematically shows a usage scene of a warning system 10.

FIG. 1 schematically shows a usage scene of a warning system 10. The warning system 10 includes a vehicle 20 and terminals 82a and 82b. The terminal 82a is a terminal carried by a pedestrian 80a, and the terminal 82b is a terminal carried by a pedestrian 80b. The pedestrians 80a and 80b may be collectively referred to as "pedestrian 80". Moreover, the terminal 82a and the terminal 82b may be collectively referred to as "terminal 82". The vehicle 20 is one example of a "moving body".

In the warning system 10, the vehicle 20 transmits warning information to the terminal 82 when there exists a pedestrian 80 having a risk of approaching the vehicle 20. When receiving the warning information, the terminal 82 gives a warning to the pedestrian 80 by warning display, sound, vibration, or the like. In this way, the pedestrian 80 is notified of an approach of the vehicle 20.

Note that the terminal 82 is an example of an "external terminal". The terminal 82 may be a personal digital assistant such as a mobile phone or a smart phone. The terminal 82 includes a positioning function. The terminal 82 receives radio waves transmitted from a GNSS (Global Navigation Satellite System) satellite, for example, and measures a current position of the terminal 82 based on the radio waves transmitted from the GNSS (Global Navigation Satellite System) satellite. The terminal 82 periodically updates the current position of the terminal 82 by periodically performing positioning.

Note that in the present embodiment, a case where a "target" having a risk of approaching the vehicle 20 is a "pedestrian" will mainly be described. However, the "target" having the risk of approaching the vehicle 20 may be another moving body or vehicle. In this case, the "external terminal" may be a communication device such as a telematics control unit (TCU) provided in another vehicle.

The vehicle 20 includes a sensor 29 and a communication device 24. The sensor 29 includes a camera and a radar. The sensor 29 acquires information in a range from a left borderline 31 to a right borderline 32. For example, the sensor 29 acquires an image and distance measurement information in the range from the left borderline 31 to the right borderline 32. The communication device 24 recognizes the image acquired by the camera to detect the pedestrian 80. Further, the communication device 24 detects a current position of the pedestrian 80 based on the distance measurement information acquired by the radar and a current position of the vehicle 20. The communication device 24 specifies a moving direction or the like of the pedestrian 80 based on an orientation or the like of the pedestrian 80. The communication device 24 specifies, based on the current position and the moving direction of the pedestrian 80, the pedestrian 80 who has a risk of approaching the vehicle 20, in particular, who can be on a planned traveling route of the vehicle 20.

For example, in the situation shown in FIG. 1, the vehicle 20 is traveling on a roadway 50. A sidewalk 60 is provided along with the roadway 50. The sensor 29 detects the pedestrians 80a and 80b walking on the sidewalk 60. Since the pedestrian 80b is facing a direction of walking on the sidewalk 60 in parallel with the roadway 50, the communication device 24 determines that the pedestrian 80b is unlikely to approach the vehicle 20. On the other hand, since the pedestrian 80a is facing a direction of heading to the roadway 50, the communication device 24 determines that the pedestrian 80a has a risk of approaching the vehicle 20.

For acquiring positional information of the terminal 82a, the communication device 24 transmits request information for requesting positional information to the terminal 82. At this time, the communication device 24 incorporates positional information indicating the position of the pedestrian 80a, that has been detected by the sensor 29, into the request information. Upon receiving the request information, the terminal 82a performs positioning using a positioning function of the terminal 82a when a distance between the position indicated by the positional information included in the request information and the current position of the terminal 82a is smaller than a predetermined value. The terminal 82a transmits response information including latest positional information obtained by the positioning and address information of the terminal 82a to the vehicle 20. On the other hand, upon receiving the request information, the terminal 82b determines that a distance between the position indicated by the positional information included in the request information and the current position of the terminal 82b is larger than the predetermined value and does not transmit the response information.

Upon receiving the response information from the terminal 82a, the communication device 24 transmits warning information based on the positional information of the terminal 82a included in the response information. For example, the communication device 24 eventually determines whether the pedestrian 80a has a risk of approaching the vehicle 20 based on the positional information of the terminal 82a included in the response information and the moving direction or the like of the pedestrian 80a specified by the sensor 29. When determining that the pedestrian 80a has a risk of approaching the vehicle 20, the communication device 24 transmits warning information while setting the address information of the terminal 82a included in the response information as a destination.

Upon receiving the warning information, the terminal 82a warns the pedestrian 80a by an HMI (Human Machine Interface) function of the terminal 82a. Note that when receiving radio waves of the warning information transmitted from the vehicle 20 to the terminal 82a, the terminal 82b determines that the destination of the warning information is not the terminal 82b and does not warn the pedestrian 80b.

As described above, the communication device 24 incorporates the positional information of the pedestrian 80a predicted to approach the vehicle 20 into the request information and transmits it to the terminal 82. Therefore, based on the positional information included in the request information and the current position of the terminal 82a, the terminal 82a performs positioning after determining that a response should be made to the request information, and transmits the latest positional information of the terminal 82a to the vehicle 20. Accordingly, the communication device 24 can determine whether it is necessary to transmit the warning information using the latest positional information of the terminal 82a. Then, when determining that it is not necessary to transmit the warning information, the communication device 24 can avoid transmitting the warning information. Accordingly, an increase of communication traffics can be suppressed.

When the request information for positional information is received, the terminal 82b determines that there is no need to respond to the request information based on the positional information included in the request information and the current position of the terminal 82b. Therefore, the terminal 82b only needs to discard the request information received from the vehicle 20 and does not need to additionally perform processing based on the request information. Further, since the terminal 82b does not transmit response information, an increase of communication traffics can be suppressed.

Note that as a technique of detecting a physical body having a risk of approaching the vehicle 20, there is a detection technique that uses distance measurement information and moving vectors obtained by a radar. However, this technique may misrecognize, for example, a physical body moving on a footbridge or an elevated road as a physical body approaching the vehicle 20. To avoid such misrecognition, it is necessary to perform three-dimensional recognition processing with reference to three-dimensional map information. Moreover, since multiple times of measurement are required to calculate the moving vector, it may take some time to detect the physical body having a risk of approaching the vehicle 20. In contrast, according to the warning system 10, since a type or orientation of a physical body that approaches the vehicle 20 can be detected using an image recognition, the physical body that approaches the vehicle 20 can be detected appropriately as compared to a case where a physical body that approaches the vehicle 20 is detected using mainly the distance measurement information and the moving vectors.

Note that a range in which the sensor 29 acquires information, that is, the range from the left borderline 31 to the right borderline 32 may be variable depending on a velocity of the vehicle 20 or an external situation of the vehicle 20. Making the range in which the sensor 29 acquires information variable depending on a vehicle velocity or an external situation of a vehicle, allows a physical body to be chosen that is more suitable for the situation.

Further, as described above, according to the warning system 10, the communication device 24 transmits warning information based on the latest positional information obtained by the positioning by the terminal 82. Therefore, it becomes possible to cause the terminal 82a of the pedestrian 80a who needs to be warned to perform warning, and cause the terminal 82b of the pedestrian 80b who does not need to be warned not to perform warning. Thereby, it is possible to prevent a warning from being given to the pedestrian 80 who do not need a warning. Further, since it becomes possible to suppress unnecessary communication from being executed between the terminal 82 and the vehicle 20, an increase of communication traffics can be suppressed. In particular, the terminal 82b does not need to perform processing such as checking a position of the vehicle 20 approaching the pedestrian 80b or communicating with the vehicle 20.

Note that communication between the communication device 24 and the terminal 82 is executed by direct communication. For example, the communication device 24 directly communicates with the terminal 82 by short-range direct communication in Cellular-V2X. Short-range direct communication in Cellular-V2X includes a communication method such as LTE-V2X PC5 or 5G-V2X PC5 (abbreviated as "PC5" in the present embodiment). As the direct communication between the communication device 24 and the terminal 82, a form that uses Wi-Fi (registered trademark) or DSRC (Dedicated Short Range Communications) may be adopted. As direct communication between the communication device 24 and the terminal 82, any direct communication method such as Bluetooth (registered trademark) in addition to Cellular-V2X or DSRC (registered trademark) may be adopted. The communication device 24 may also use a communication infrastructure provided in ITS (Intelligent Transport Systems) to directly communicate with the terminal 82.

Figure 2:
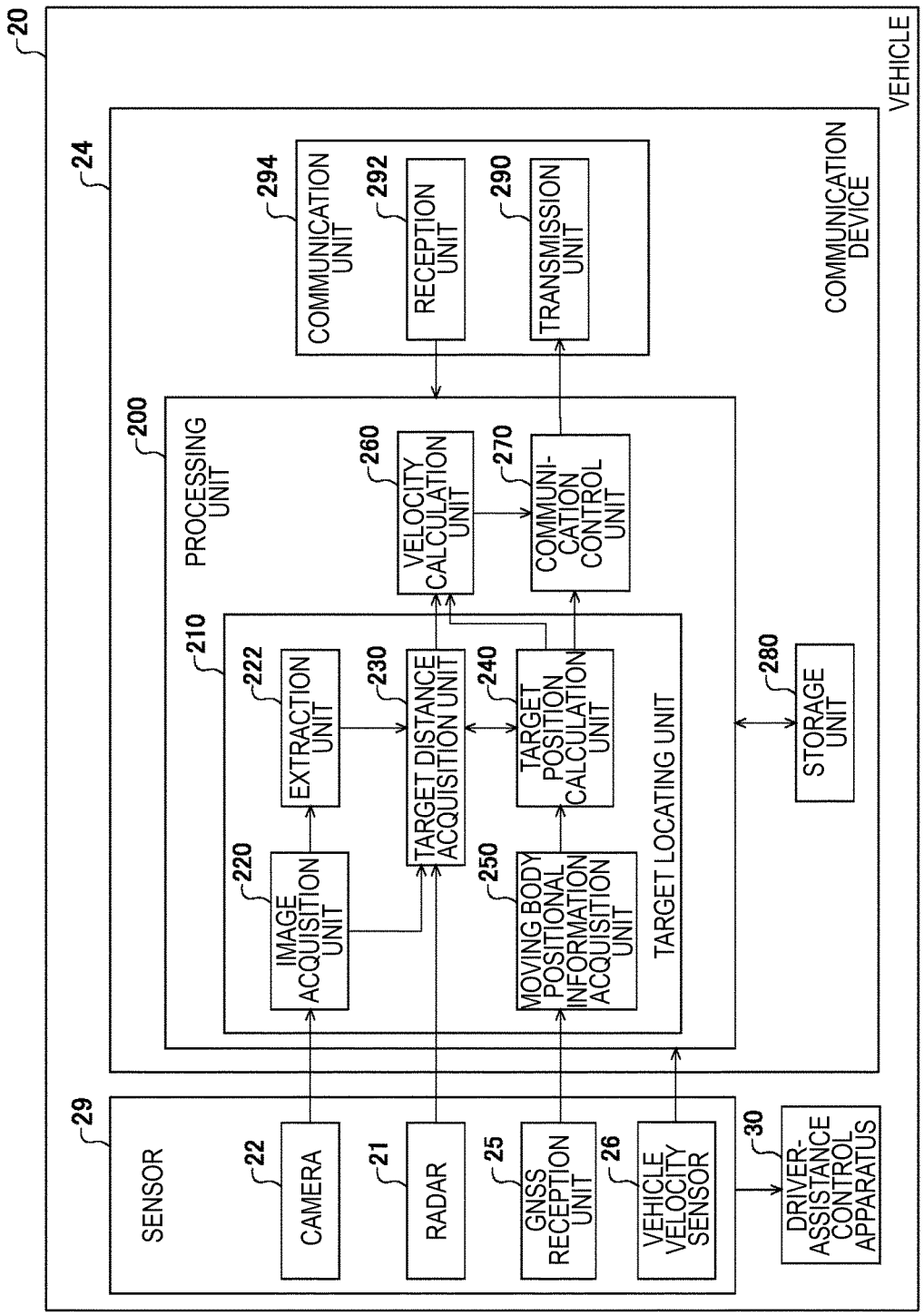
FIG. 2 shows a system configuration of a vehicle 20.

FIG. 2 shows a system configuration of the vehicle 20. The vehicle 20 includes the sensor 29, the communication device 24, and a driver-assistance control apparatus 30.

The sensor 29 includes a radar 21, a camera 22, a GNSS reception unit 25, and a vehicle velocity sensor 26. The radar 21 may be LiDAR, a millimeter-wave radar, or the like. The GNSS reception unit 25 receives radio waves transmitted from a GNSS satellite. The GNSS reception unit 25 generates information indicating a current position of the vehicle 20 based on a signal received from the GNSS satellite. The camera 22 captures an image of a surrounding area of the vehicle 20 to generate image information. For example, the camera 22 captures an image in a traveling direction of the vehicle 20 to generate image information. Note that the sensor 29 may include a position sensor such as an odometer or IMU (Inertial Measurement Unit) such as an acceleration sensor or an attitude sensor.

The communication device 24 includes a processing unit 200, a storage unit 280, and a communication unit 294. The processing unit 200 is realized by, for example, an arithmetic processing apparatus including a processor. The storage unit 280 is realized by including a nonvolatile storage medium. The processing unit 200 performs processing by using information stored in the storage unit 280. The communication unit 294 is responsible for direct communication with the terminal 82. The communication unit 294 includes a transmission unit 290 and a reception unit 292. The processing unit 200 may be realized by an ECU (Electronic Control Unit) including a microcomputer equipped with a CPU, ROM, RAM, I/O, a bus, and the like.

The processing unit 200 includes a target locating unit 210, a velocity calculation unit 260, and a communication control unit 270. The target locating unit 210 locates a position of a target having a risk of approaching the vehicle 20. In the present embodiment, the "target having a risk of approaching the vehicle 20" is, for example, a moving body, and may include at least one of a person or a vehicle. Moreover, "approaching" may include, for example, approaching the planned traveling route of the vehicle 20 or overlapping the planned traveling route. The target locating unit 210 may specify a position of a pedestrian having a risk of approaching the vehicle 20. The target locating unit 210 includes an image acquisition unit 220, an extraction unit 222, a target distance acquisition unit 230, a target position calculation unit 240, and a moving body positional information acquisition unit 250.

The moving body positional information acquisition unit 250 acquires positional information of the vehicle 20. Specifically, the moving body positional information acquisition unit 250 acquires the positional information of the vehicle 20 from the GNSS reception unit 25. The image acquisition unit 220 acquires an external image of the vehicle 20. Specifically, the image acquisition unit 220 acquires from the camera 22 an image captured by the camera 22. The extraction unit 222 extracts, from the image acquired by the image acquisition unit 220, the target having a risk of approaching the vehicle 20. The target distance acquisition unit 230 acquires a distance to the target extracted by the extraction unit 222. Other than the image acquired by the image acquisition unit 220, the target distance acquisition unit 230 may acquire a distance to the target using the radar 21 installed in the vehicle 20 or may fuse those together and acquire the distance based on statistical processing. The target distance acquisition unit 230 may acquire the distance to the target based on the image acquired by the image acquisition unit 220. The target position calculation unit 240 calculates a position of a target having a risk of approaching the vehicle 20 based on the positional information of the vehicle 20 and the distance to the target.

The transmission unit 290 transmits request information including positional information of the terminal 82 as a positional information request target, based on the position of the target located by the target locating unit 210. Upon receiving the request information, the terminal 82 transmits response information including the positional information obtained by the positioning by the terminal 82. Note that the transmission unit 290 may include instruction information that instructs the terminal 82 to perform repositioning of the positional information of the terminal 82. Upon receiving the request information, the terminal 82 performs repositioning and transmits response information including positional information obtained by the repositioning. The response information may include address information for directly or indirectly communicating with the terminal 82.

The reception unit 292 receives the response information with respect to the request information. The transmission unit 290 transmits warning information based on the positional information of the terminal 82 included in the response information. For example, the target locating unit 210 may correct the positional information of the target based on the positional information of the terminal 82 included in the response information. The transmission unit 290 may transmit warning information including the positional information corrected by the target locating unit 210. For example, the target locating unit 210 may specify the positional information of the terminal 82 included in the response information as the positional information of the target, and the transmission unit 290 may transmit warning information including the positional information of the terminal 82 included in the response information. As described above, the transmission unit 290 may transmit warning information including the positional information of the terminal 82 that is to output the warning, based on the positional information of the terminal 82. By transmitting the warning information, the transmission unit 290 instructs the terminal 82 that has received the warning information to output the warning when the terminal 82 is positioned within a range determined based on the positional information included in the warning information.

Further, the target locating unit 210 may determine whether to warn the target based on the positional information of the terminal 82 included in the response information. The transmission unit 290 may transmit the warning information when the target locating unit 210 determines to warn the target. For example, the target locating unit 210 may re-determine whether the target has a risk of approaching the vehicle 20 based on the positional information of the terminal 82 included in the response information, the position of the vehicle 20, the moving direction of the vehicle 20, and the velocity of the vehicle 20, and the transmission unit 290 may transmit the warning information when the target locating unit 210 determines that the target has a risk of approaching the vehicle 20. When the address information of the terminal 82 is included in the response information, the transmission unit 290 may transmit the warning information while setting the address information as a destination.

Note that the transmission unit 290 may transmit the request information to the terminal 82 by direct communication. The transmission unit 290 may transmit the request information by broadcast. Further, the transmission unit 290 may transmit the warning information to the terminal 82 by direct communication. The transmission unit 290 may transmit the warning information by broadcast. Note that the transmission unit 290 may transmit at least one of the request information or the warning information by directional communication. For example, the transmission unit 290 may include a directional antenna so as to transmit at least one of the request information or the warning information toward a position of a target located by the target locating unit 210.

The velocity calculation unit 260 calculates information on a moving velocity of the target extracted by the extraction unit 222. For example, the velocity calculation unit 260 may calculate, based on a temporal change of the position calculated by the target position calculation unit 240, the moving velocity of the target extracted by the extraction unit 222. The velocity calculation unit 260 may calculate a relative velocity between the moving velocity of the target extracted by the extraction unit 222 and the moving velocity of the vehicle 20 detected by the vehicle velocity sensor 26. The velocity calculation unit 260 may calculate the relative velocity between the moving velocity of the target extracted by the extraction unit 222 and the moving velocity of the vehicle 20 detected by the vehicle velocity sensor 26 based on a temporal change of the distance acquired by the target distance acquisition unit 230. The velocity calculation unit 260 may also calculate the relative velocity based on the temporal change of the distance acquired by the target distance acquisition unit 230.

The communication control unit 270 selects a transmission method that is used by the transmission unit 290 to transmit at least one of the request information or the warning information. The communication control unit may select the transmission method based on at least any of the moving velocity of the target, the moving velocity of the vehicle 20, and the relative velocity between the vehicle 20 and the target. The communication control unit 270 may select the transmission method based on a category of the target.

The transmission method may include a first transmission method in which at least one of the request information or the warning information is transmitted at a first signal intensity and a second transmission method in which at least one of the request information or the warning information is transmitted at a second signal intensity different from the first signal intensity. The selection of the transmission method may include selecting one of the first transmission method and the second transmission method. Alternatively, the transmission method may include a first transmission method in which at least one of the request information or the warning information is transmitted to the terminal 82 associated with the target by unicast and a second transmission method in which at least one of the request information or the warning information is transmitted by broadcast. The selection of the transmission method may include selecting one of the first transmission method and the second transmission method.

The driver-assistance control apparatus 30 uses the information detected by the sensor 29 to assist driving of the vehicle 20. The driver-assistance control apparatus 30 may be realized by an ECU having a function of ADAS (Advanced Driver-Assistance Systems).

Figure 3:
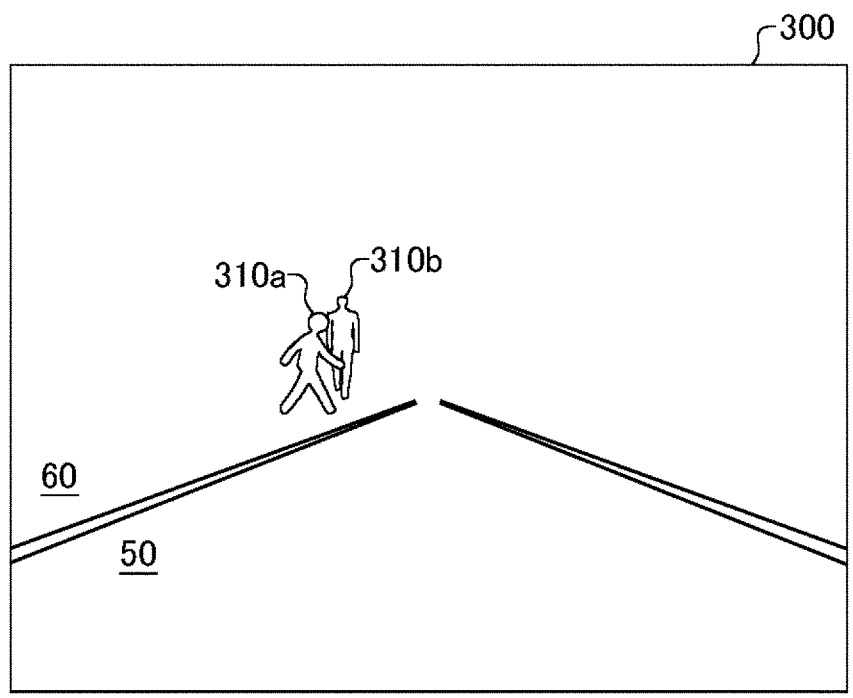
FIG. 3 schematically shows an image 300 captured by a camera 22.
Figure 4:
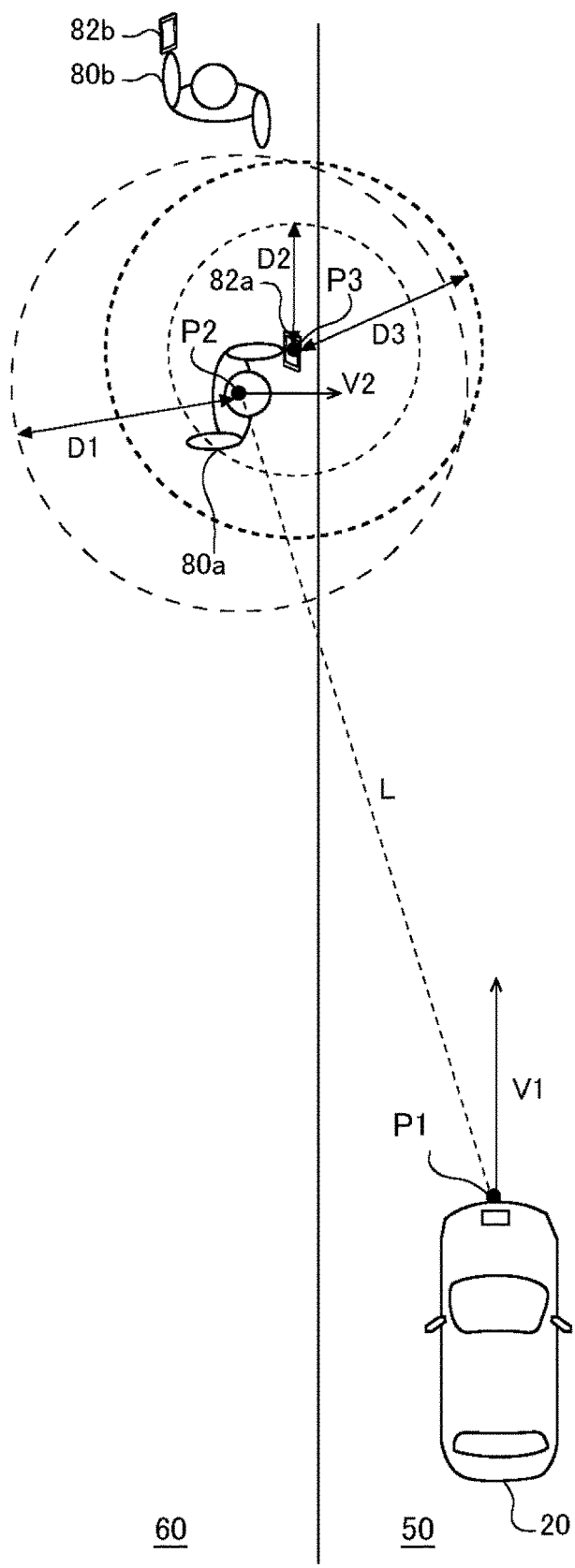
FIG. 4 schematically shows a situation where the image 300 has been captured.

FIG. 3 schematically shows an image 300 captured by the camera 22. FIG. 4 schematically shows a situation where the image 300 has been acquired.

The image acquisition unit 220 acquires the image 300 from the camera 22. The extraction unit 222 analyzes the image 300 to extract an object of the pedestrian 80 having a risk of approaching the vehicle 20. For example, the extraction unit 222 extracts, from the image 300, an object of a predetermined physical body such as a person or a vehicle which can be a "target" in this embodiment, to specify an orientation of each physical body based on the extracted object. The extraction unit 222 may specify the orientation of each physical body based on a shape of the object of the physical body. The extraction unit 222 specifies, based on the specified orientation, an object of a physical body having a risk of approaching the planned traveling route of the vehicle 20.

For example, in an example of FIG. 3, an object 310a and an object 310b are an object of a person. The body of the object 310a is facing toward the roadway 50. On the other hand, the body of the object 310b is not facing toward the roadway 50. Therefore, the extraction unit 222 extracts the object 310a as an object of the target having a risk of approaching the vehicle 20.

The target distance acquisition unit 230 acquires distance measurement information from the radar 21. The target distance acquisition unit 230 calculates a distance L from a reference position P1 of the vehicle 20 to a position P2 of the pedestrian 80a, based on the distance measurement information acquired from the radar 21 and a position of the object 310a on the image 300. For example, the target distance acquisition unit 230 may cause the radar 21 to measure a distance to a physical body existing in a direction on a real space corresponding to the position of the object 310a. Moreover, the target distance acquisition unit 230 may specify the distance L, by acquiring, from the radar 21, distance measurement information on a plurality of points on a real space, and selecting, from the distance measurement information on the plurality of points, distance measurement information on a point corresponding to the position of the object 310a on the image 300. The target distance acquisition unit 230 may also specify the distance L by analyzing the image 300. The target distance acquisition unit 230 may specify the distance L based on a size of an object in the image 300. The target distance acquisition unit 230 may specify the distance L based on a blur amount and a color shift amount extracted from an area of the object 310a of the image, by taking advantage of the fact that a blur amount and a color shift amount vary depending on a distance to a subject. The target distance acquisition unit 230 may specify the distance L based on disparity information acquired by the camera 22. When the camera 22 is a twin-lens camera, the target distance acquisition unit 230 may specify the distance L by extracting the disparity information from an image acquired from the twin-lens camera. Moreover, the target distance acquisition unit 230 may also specify the distance L by fusing data on the distance L specified with a plurality of different techniques or by weighting and adding up the data.

The target position calculation unit 240 acquires the positional information of the vehicle 20 detected by the GNSS reception unit 25. The target position calculation unit 240 calculates the position P2 of the pedestrian 80a in FIG. 4, based on the reference position P1 of the vehicle 20 based on the positional information detected by the GNSS reception unit 25, the distance L acquired by the target distance acquisition unit 230, and the position of the object 310a in the image 300. The communication control unit 270 generates request information including positional information that indicates the position P2. In the present embodiment, the positional information included in the request information is coordinate information that indicates a geographic position of the position P2. The communication control unit 270 causes the transmission unit 290 to transmit the request information.

Upon receiving the request information transmitted from the transmission unit 290, each of the terminals 82a and 82b extracts the coordinate information of the position P2 from the request information. The terminal 82a and the terminal 82b each determine whether the terminal 82 is near the point P2. For example, the terminal 82a and the terminal 82b each determine whether a distance between a current position of the terminal 82 and the point P2 is equal to or smaller than a predetermined distance D1. Since the distance between the current position of the terminal 82a and the point P2 is equal to or smaller than D1, the terminal 82a determines that the terminal 82a is near the point P2 and performs positioning using GNSS signals.

Note that when the positioning is set to be performed periodically using the GNSS signals in the terminal 82a, the terminal 82a may perform positioning using the GNSS signals separate from the periodic positioning. Even when the periodic positioning using GNSS signals is prohibited in the terminal 82a, the terminal 82a may perform the positioning using GNSS signals upon receiving the request information. On the other hand, since the distance between the current position of the terminal 82 and the point P2 exceeds D1, the terminal 82b determines that the terminal 82b is not near the point P2 and discards the request information without performing repositioning according to the request information.

The terminal 82a transmits response information including positional information that indicates a position of a point P3 measured by the positioning to the vehicle 20. When the reception unit 292 receives the response information in the vehicle 20, the target position calculation unit 240 corrects the position of the pedestrian 80a based on the point P3 indicated by the positional information included in the response information.

As an example, the target position calculation unit 240 may determine that the pedestrian 80a is positioned at the point P3. Further, assuming that the pedestrian 80a is positioned within a distance D2 from the point P3 as a center, the target position calculation unit 240 may determine that the pedestrian 80a is positioned at the point P3 under a condition that the point P2 specified before transmission of the request information is not within the distance D2. Then, the target locating unit 210 determines whether the pedestrian positioned at the point P3 has a risk of approaching the vehicle 20 and when determined that the pedestrian positioned at the point P3 has a risk of approaching the vehicle 20, the transmission unit 290 transmits warning information to the terminal 82a. Note that when a distance between the point P2 specified before transmission of the request information and the point P3 is equal to or smaller than the distance D2, the target position calculation unit 240 may judge that the pedestrian 80a is positioned at the point P2. In this case, the warning information may be transmitted to the terminal 82a without judging whether the pedestrian 80a has a risk of approaching the vehicle 20. Note that when transmitting the warning information to the terminal 82a, the communication control unit 270 may generate warning information including positional information that indicates the point P3 extracted from the response information, and cause the transmission unit 290 to transmit the warning information.

Upon receiving the warning information transmitted from the transmission unit 290, the terminals 82a and 82b each extract coordinate information of the point P3 from the warning information. The terminals 82a and 82b respectively determine whether the respective terminals 82 are near the point P3. For example, the terminals 82a and 82b determine whether distances between the current positions of the respective terminals 82 and the point P3 are equal to or smaller than a predetermined distance D3. Since the distance between the current position of the terminal 82a and the point P3 is equal to or smaller than D3, the terminal 82a determines that the terminal 82 is near the point P3 and outputs a warning. Note that D3 and D1 may be of the same length. D3 may be shorter than D1. The transmission unit 290 may transmit request information including distance information that indicates D1. The transmission unit 290 may transmit warning information while incorporating therein the distance information that indicates D3.

Note that the velocity calculation unit 260 may calculate a velocity V2 of the pedestrian 80a. For example, the velocity calculation unit 260 may calculate the velocity V2 of the pedestrian 80a based on a temporal change amount of the position calculated by the target position calculation unit 240. The communication control unit 270 may select a transmission method that is used by the transmission unit 290 to transmit the request information based on the velocity V2. The communication control unit 270 may also select the transmission method that is used by the transmission unit 290 to transmit the request information based on the velocity V1 of the vehicle 20. The communication control unit 270 may specify the velocity V1 based on at least the velocity of the vehicle 20 detected by the vehicle velocity sensor 26. The communication control unit 270 may specify the velocity V1 based on a temporal change amount of the position of the vehicle 20 detected by the GNSS reception unit 25. The communication control unit 270 may calculate a relative velocity between the vehicle 20 and the pedestrian 80a based on the velocity V1 and the velocity V2 and select the transmission method used by the transmission unit 290 to transmit the request information based on the calculated relative velocity. Similarly, the communication control unit 270 may select the transmission method used by the transmission unit 290 to transmit the warning information based on the velocity V2. The communication control unit 270 may select the transmission method used by the transmission unit 290 to transmit the warning information based on the velocity V1 of the vehicle 20. The communication control unit 270 may select the transmission method used by the transmission unit 290 to transmit the warning information based on the relative velocity between the vehicle 20 and the pedestrian 80a. An example of a method for the communication control unit 270 to determine the transmission method based on the velocity will be described later.

Figure 5:
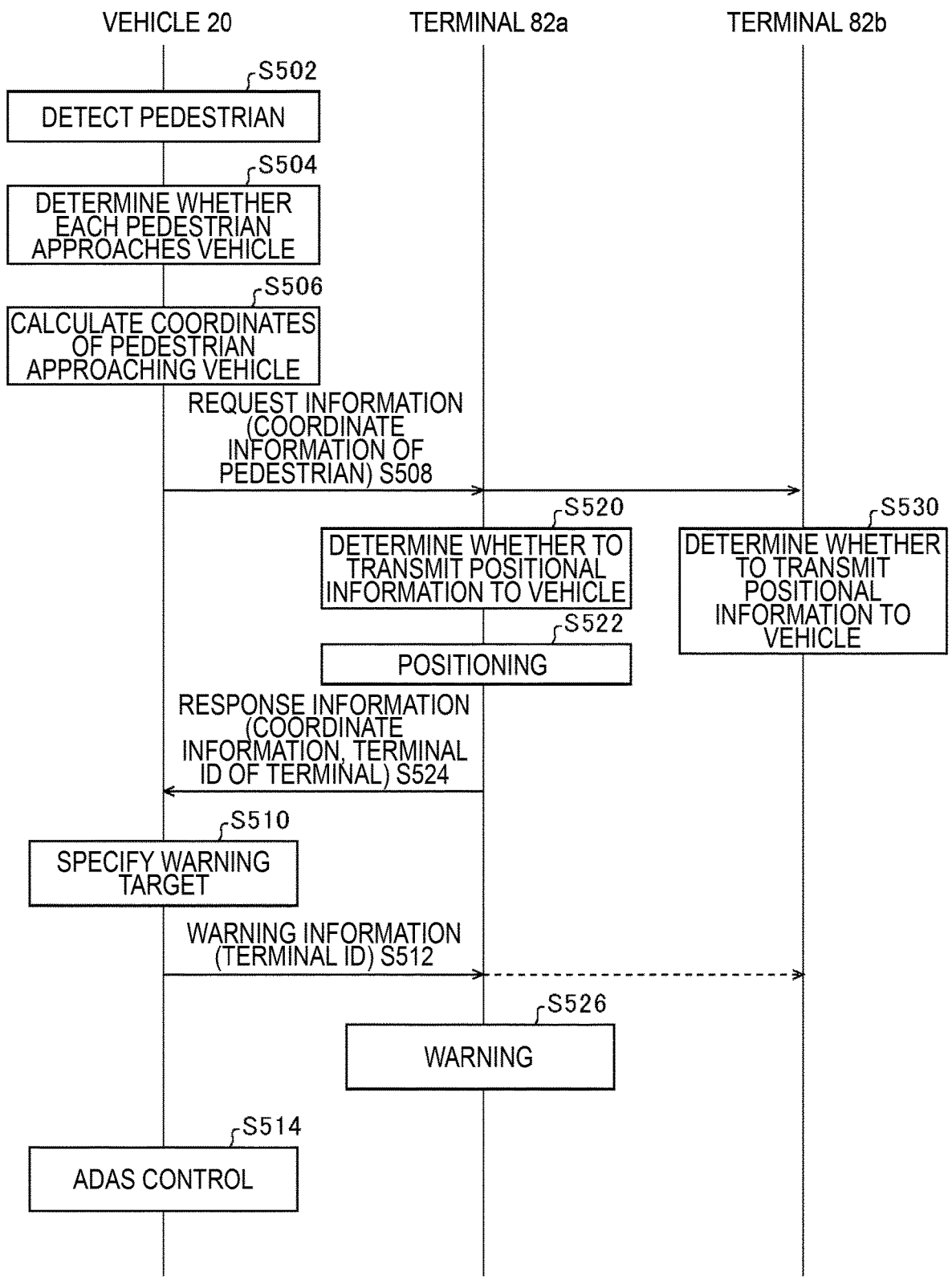
FIG. 5 schematically shows a flow of processing executed by the vehicle 20, a terminal 82a, and a terminal 82b.

FIG. 5 schematically shows a flow of processing executed by the vehicle 20 and the terminals 82a and 82b. FIG. 5 will describe a case where a pedestrian is recognized as a target having a risk of approaching the vehicle 20.

In S502, the extraction unit 222 extracts objects of pedestrians from an image acquired from the camera 22. In S504, the extraction unit 222 determines whether there is a risk of approaching the vehicle 20 for each pedestrian corresponding to each extracted object. In S506, the target position calculation unit 240 calculates coordinates of the pedestrian having a risk of approaching the vehicle 20.

In S508, the transmission unit 290 transmits request information including the coordinate information of the position of the pedestrian calculated in S506. At this time, the transmission unit 290 may transmit the request information by broadcast without designating the terminal 82 that is to become a destination of the warning information. The transmission unit 290 may designate the terminal 82 as the destination of the request information and transmit the request information by unicast. The transmission unit 290 may specify an address of a peripheral terminal 82 that has been acquired before transmitting the request information and transmit the request information to the terminal 82 by unicast. As an example, before causing the transmission unit 290 to transmit the request information after specifying the coordinates of the pedestrian in S506, the transmission unit 290 may acquire the address of the terminal 82 existing in a periphery of the vehicle 20 by direct communication and transmit warning information to the terminal 82 by unicast while setting the acquired address as the destination. The transmission unit 290 may acquire, based on beacon information transmitted from the terminal 82 existing in the periphery of the vehicle 20, the address of the terminal 82, and transmit the request information to the terminal 82 by unicast while setting the acquired address as the destination.

Upon receiving the request information from the communication device 24, the terminal 82*a* determines whether to transmit the positional information to the vehicle 20 in S520. For example, in the example shown in FIG. 4, the terminal 82*a* determines that the distance between the current position of the terminal 82*a* and coordinates of the point P2 included in the request information is equal to or smaller than D1. Therefore, the terminal 82*a* determines to transmit the positional information to the vehicle and performs positioning in S522. Note that the terminal 82*a* may perform the positioning upon receiving the request information for the positional information and thereafter perform the determination of S520. In S524, response information including the coordinate information of the terminal 82*a* measured by the positioning is transmitted to the vehicle 20. Note that the response information includes a terminal ID of the terminal 82*a* as a transmission source of the response information. The terminal ID included in the response information is an example of the address information.

Meanwhile, in S530, the terminal 82*b* determines that the distance between the current position of the terminal 82*b* and the point P2 included in the request information exceeds D1. Accordingly, the terminal 82*b* determines not to transmit the positional information to the vehicle and discards the request information without performing positioning. Note that the terminal 82*b* may perform the positioning upon receiving the request information for the positional information and thereafter perform the determination of S530.

When the reception unit 292 receives the response information in the vehicle 20, in S510, the target position calculation unit 240 specifies a warning target based on the coordinate information of the terminal 82*a* included in the response information. For example, in the example shown in FIG. 4, the target position calculation unit 240 may assume that the pedestrian 80*a* is positioned at the point P3 included in the response information and determine that the pedestrian 80*a* is to be the warning target when the pedestrian 80*a* has a risk of approaching the vehicle 20. When determined that the pedestrian 80*a* is to be the warning target, in S512, the transmission unit 290 transmits warning information while setting a terminal ID of a transmission source of the response information received in S524 as a destination. When the terminal ID of the transmission destination of the warning information can be specified as described above, the transmission unit 290 may transmit the warning information by unicast.

Upon receiving the warning information from the communication device 24, the terminal 82*a* warns the pedestrian 80*a* using the HMI function of the terminal 82*a* in S526. Note that although radio waves of the warning information transmitted from the communication device 24 are received, since the terminal 82*b* does not correspond to the destination of the warning information, the terminal 82*b* discards the warning information without performing warning.

Note that after transmitting the warning information in S512 in the vehicle 20, the driver-assistance control apparatus 30 performs driver assistance in S514. For example, when a predetermined condition is met, the driver-assistance control apparatus 30 may notify the pedestrian of approach of the vehicle 20 by decelerating the vehicle 20 or performing beam passing or horn announcement, with a function of an Advanced Emergency Braking System.

Figure 6:
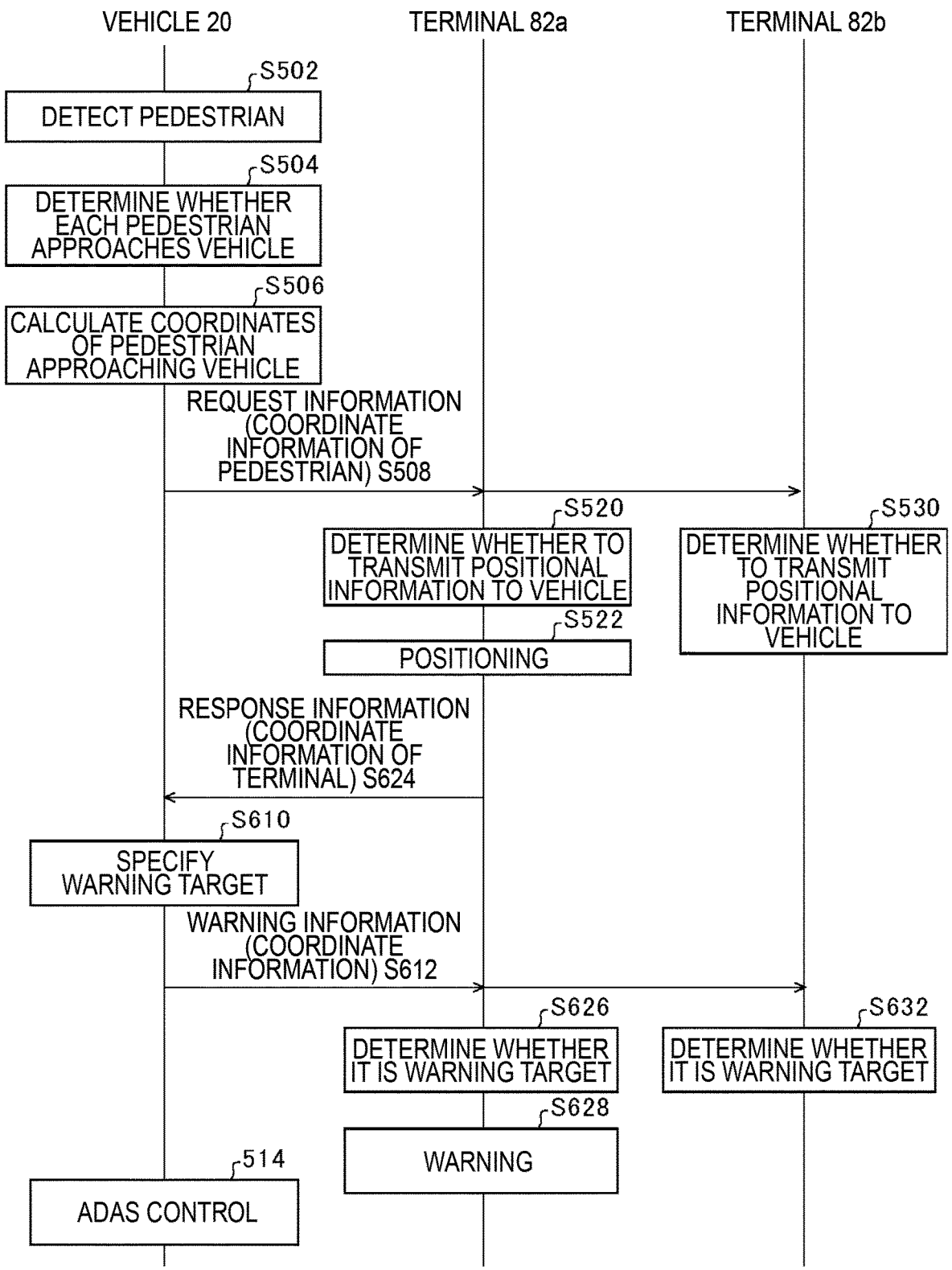
FIG. 6 schematically shows a flow of another processing executed by the vehicle 20 and the terminals 82a and 82b.

FIG. 6 schematically shows a flow of another processing executed by the vehicle 20 and the terminals 82*a* and 82*b*. The processing of S502, S504, S506, S508, S514, S520, S522, and S530 shown in FIG. 6 is the same as the processing of S502, S504, S506, S508, S514, S520, S522, and S530 shown in FIG. 5, so descriptions thereof will be omitted.

After performing the positioning in S522, the terminal 82*a* transmits the response information including the coordinate information of the terminal 82*a* measured by the positioning to the vehicle 20 in S624. Here, the response information does not include the terminal ID of the terminal 82*a* as the transmission source of the response information.

When the reception unit 292 receives the response information in the vehicle 20, in S610, the target position calculation unit 240 specifies a warning target based on the coordinate information of the terminal 82*a* included in the response information. The processing of S610 is the same as the processing of S510, so descriptions thereof will be omitted. When it is determined in S610 that the pedestrian 80*a* is to be the warning target, the transmission unit 290 transmits warning information including the positional information received in S624 in S612. When address information of the terminal 82 as the transmission destination of the warning information is unknown, the transmission unit 290 may transmit the warning information including the positional information by broadcast without designating the terminal 82 as a destination of the warning information.

Upon receiving the warning information transmitted from the communication device 24, the terminal 82*a* determines whether to perform warning in S626. For example, in the example shown in FIG. 4, the terminal 82*a* determines that the distance between the current position of the terminal 82*a* and the coordinates of the point P3 included in the warning information is equal to or smaller than D3. Therefore, the terminal 82*a* uses the HMI function of the terminal 82*a* to give a warning to the pedestrian 80*a* in S628. On the other hand, in S632, the terminal 82*b* determines that the distance between the current position of the terminal 82*b* and the coordinates of the point P3 included in the warning information exceeds D3. Accordingly, the terminal 82*b* discards the warning information without giving a warning.

Note that the form in which the transmission unit 290 transmits the warning information by unicast when the terminal ID is included in the response information has been described in association with FIG. 5. Further, the form in which the warning information including the coordinate information of the terminal 82 is transmitted by broadcast when the terminal ID is not included in the response information has been described in association with FIG. 6. However, the processing of FIGS. 5 and 6 may be combined arbitrarily. For example, in S512 of FIG. 5, the warning information including the coordinate information of the terminal 82 may be transmitted to the terminal 82*a* by unicast so that the terminal 82*a* thereafter performs the processing of S626. Further, in S512 of FIG. 5, the warning information including the coordinate information of the terminal 82*a* may be transmitted by broadcast so that the terminal 82*a* thereafter performs the processing of S626.

FIG. 7 shows a data structure of transmission method information referred to by the communication control unit 270 to specify the transmission method. The transmission method information associates a category, a velocity, and a transmission method. Referring to the transmission method information, the communication control unit 270 determines the transmission method for transmitting at least one of the request information or the warning information. The transmission method information is stored in the storage unit 280. Note that to prevent descriptions from becoming redundant, the request information and the warning information will be referred to as "transmission information" in descriptions of FIG. 7.

A "category" is information for identifying a category of a physical body which can be a target of a warning such as a "pedestrian" or an "automobile", for example A "velocity" is information for indicating a range of a velocity of a physical body which can be a target of a warning.

The "transmission method" is information for identifying the transmission method for the transmission information. The "transmission method" may include information defining a transmission signal intensity of the transmission information. For example, the "method 2" may be a transmission method in which transmission is performed at a higher signal intensity than the "method 1".

The "transmission method" may include information defining which of unicast transmission and broadcast transmission the transmission information is to be transmitted by. For example, the "method 1" may be "unicast", and the "method 2" may be "broadcast".

The "transmission method" may include information defining the number of times the transmission information is to be repeatedly transmitted in the case of broadcast transmission. For example, the "method 2" may be a transmission method in which transmission is performed with a larger number of repeated transmissions than the "method 1".

The "transmission method" may include information defining a period for repeatedly transmitting the transmission information in the case of broadcast transmission. For example, the "method 2" may be a transmission method in which transmission is performed with a longer period of repeated transmissions than the "method 1".

The "transmission method" may include information defining a frequency of repeatedly transmitting the transmission information in the case of broadcast transmission. For example, the "method 2" may be a transmission method in which transmission is performed with a higher frequency of repeated transmissions than the "method 1". The "transmission method" may include information defining a time interval for repeatedly transmitting the transmission information in the case of broadcast transmission. For example, the "method 2" may be a transmission method in which transmission is performed at a shorter interval of repeated transmissions than the "method 1".

The "transmission method" may include information defining whether to perform retransmission control of the transmission information in unicast transmission. For example, the "method 1" may be a transmission method in which no retransmission control is performed, and the "method 2" may be a transmission method in which retransmission control is performed.

The "transmission method" may include information indicating the number of retransmission attempts by which the transmission information is attempted to be retransmitted in unicast transmission. For example, the "method 2" may be a transmission method in which transmission is performed with a larger number of retransmission attempts than the "method 1".

The "transmission method" may include information for identifying whether to transmit the transmission information by PC5. The "transmission method" may include information for identifying whether to transmit the transmission information by DSRC (registered trademark). The "transmission method" may include information for identifying whether to transmit the transmission information by Bluetooth (registered trademark). For example, the "method 1" may indicate that the transmission information is to be transmitted by DSRC (registered trademark), and the "method 2" may indicate that the transmission information is to be transmitted by PC5.

The communication control unit 270 selects, in the transmission method information, a transmission method associated with a combination of a category specified by the target locating unit 210 and a moving velocity calculated by the velocity calculation unit 260, to perform transmission by the selected transmission method. As an example, described will be a case where the "method 1" is a "unicast" transmission method and the "method 2" is a "broadcast" transmission method. When the velocity is higher than a predetermined velocity, the communication control unit 270 selects at least a "broadcast" transmission method with reference to the transmission method information. Specifically, if a category of a warning target is a pedestrian, when a velocity of the pedestrian is 2 km/s or less, the communication control unit 270 selects "unicast", and when the velocity of the pedestrian exceeds 2 km/s, the communication control unit 270 selects "broadcast". If a category of a warning target is an automobile, when a vehicle velocity of the automobile is 5 km/s or less, the communication control unit 270 selects "unicast", and when the vehicle velocity exceeds 5 km/s, the communication control unit 270 selects "broadcast". Note that the "transmission method" may determine a combination of a plurality of transmission methods. For example, the "transmission method" may define that the transmission information is to be transmitted by "unicast" and "broadcast" in association with the case where the vehicle velocity of the automobile exceeds 5 km/s.

As described above, the communication control unit 270 selects the transmission method for the transmission information based on the category of the target extracted by the extraction unit 222. Accordingly, the communication control unit 270 can select the transmission method for the transmission information according to a risk level that is based on the category of the target and the moving velocity of the target. Note that the above-described selection of the transmission method is merely an example. For the selection of the transmission method, an optimal transmission method only has to be selected, in total consideration of a category of a target, risk of the target approaching the vehicle 20, time taken for the target to approach the vehicle 20, communication reliability, a degree of communication congestion, or the like. For example, there may be a case where the "method 1" is "broadcast" and the "method 2" is "unicast".

Note that the transmission unit 290 may transmit transmission information including category information that indicates a category of the target extracted by the extraction unit 222. When the transmission information is received, the terminal 82 may extract the category information included in the transmission information and determine not to perform warning or positioning when the extracted category information does not coincide with predetermined category information of the terminal 82. For example, when the vehicle 20 transmits transmission information including the category information of "pedestrian", another vehicle that has received the transmission information may determine not to perform warning or positioning since it does not coincide with the category indicated by the category information included in the transmission information.

Figure 8:
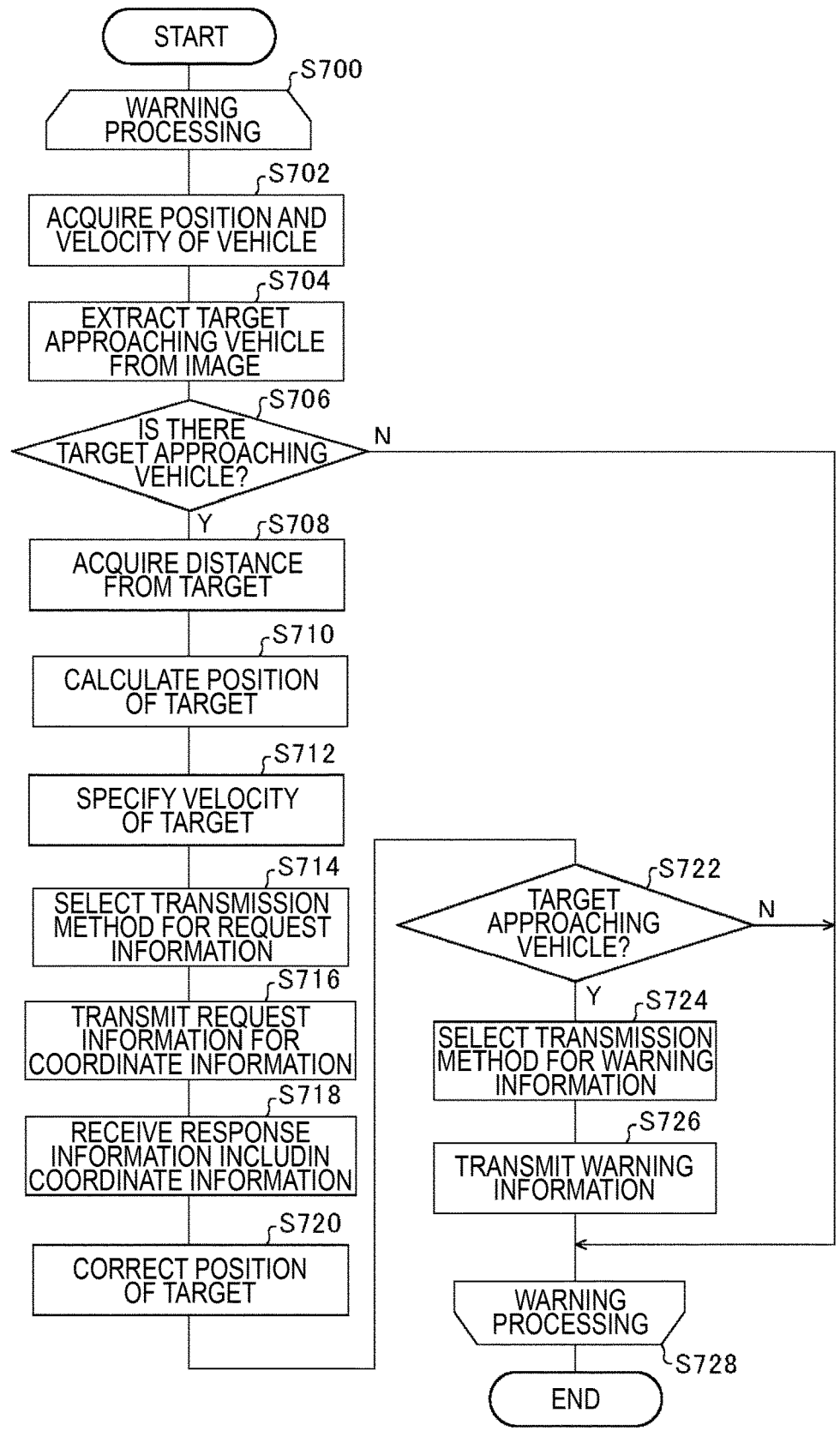
FIG. 8 shows a flowchart according to a communication method executed by a communication device 24.

FIG. 8 shows a flowchart according to a communication method executed by the communication device 24. The communication device 24 repeatedly executes processing from a starting point S700 of a warning processing loop to an ending point S728 of the warning processing loop. When a predetermined condition is met in at least one of the starting point S700 of the warning processing and the ending point S728 of the warning processing, the communication device 24 ends the warning processing loop.

In S702, the moving body positional information acquisition unit 250 and the velocity calculation unit 260 respectively acquire a current position and a moving velocity of the vehicle 20. For example, the moving body positional information acquisition unit 250 acquires positional information successively output from the GNSS reception unit 25. Further, the velocity calculation unit 260 acquires velocity information successively output from the vehicle velocity sensor 26.

In S704, the extraction unit 222 extracts, from an image acquired by the image acquisition unit 220 from the camera 22, a target having a risk of approaching the vehicle 20. Moreover, the extraction unit 222 specifies, from the image, a category of the target having a risk of approaching the vehicle 20.

In S706, the target distance acquisition unit 230 determines whether the target having a risk of approaching the vehicle 20 has been extracted. When no target having a risk of approaching the vehicle 20 has been extracted, the processing advances to S728. On the other hand, when a target having a risk of approaching the vehicle 20 has been extracted, the target distance acquisition unit 230 acquires in S708 a distance to the target extracted in S704. The target distance acquisition unit 230 acquires, based on the distance measurement information from the radar 21 or an analysis result of the image acquired by the image acquisition unit 220, the distance to the target extracted in S704.

In S710, the target position calculation unit 240 calculates a position of the target extracted in S704. Specifically, the target position calculation unit 240 calculates, based on the position of the vehicle acquired in S702, the distance to the target acquired in S708, and the position of the target in the image, geographic coordinates indicating the position of the target extracted in S704.

In S712, the velocity calculation unit 260 calculates a moving velocity of the target extracted in S704. For example, the velocity calculation unit 260 may calculate, based on a temporal change amount of the position of the target extracted in S704, the velocity of the target extracted in S704. The velocity calculation unit 260 may also calculate a relative moving velocity between the target and the vehicle 20.

In S714, the communication control unit 270 selects a transmission method for request information based on the moving velocity calculated in S712 and the category of the target extracted in S704.

In S716, the transmission unit 290 transmits request information including the coordinates of the target calculated in S710 according to the transmission method selected in S714. In S718, the reception unit 292 receives response information including the coordinate information of the terminal 82. In S720, the target position calculation unit 240 corrects the position of the target based on the coordinate information included in the response information. For example, the target position calculation unit 240 may assume that the coordinate information included in the response information is the positional information of the target.

In S722, the target locating unit 210 determines whether the target has a risk of approaching the vehicle 20. When determined that the target has no risk of approaching the vehicle 20, the processing advances to S728. On the other hand, when determined that the target has a risk of approaching the vehicle 20, in S724, the communication control unit 270 selects a transmission method for warning information based on the moving velocity calculated in S712 and the category of the target extracted in S704. Then, in S726, the transmission unit 290 transmits the warning information according to the transmission method selected in S724.

According to the warning system 10 described above, since the communication device 24 transmits the request information including the positional information, it becomes possible to suppress a situation where the terminal 82 of the pedestrian 80 who has no risk of approaching the vehicle 20 performs positioning. Further, the communication device 24 can determine whether it is necessary to warn the pedestrian 80 using latest positional information obtained by the positioning by the terminal 82. Furthermore, the communication device 24 can transmit warning information based on the latest positional information of the terminal 82. Therefore, it becomes possible to suppress a situation where the pedestrian 80 who does not need to be warned is warned. Moreover, it is possible to suppress occurrence of unnecessary communication between the terminals 82 and the vehicle 20. Furthermore, according to the warning system 10, each of the terminals 82 only needs to calculate the distance between the positional information included in the request information or the warning information and the current position of the terminal 82 and does not need to perform processing of checking the position of the vehicle 20 approaching the pedestrian 80 or the like. Therefore, a load on the terminal 82 can be reduced.

Note that the vehicle 20 is one example of transport equipment. The transport equipment includes an automobile such as a passenger vehicle or a bus, a saddle-type vehicle, a bicycle, and the like. In addition, the moving body includes not only a person but also transport equipment, for example, an automobile such as a passenger vehicle or a bus, a saddle-type vehicle, and a bicycle.

Figure 9:
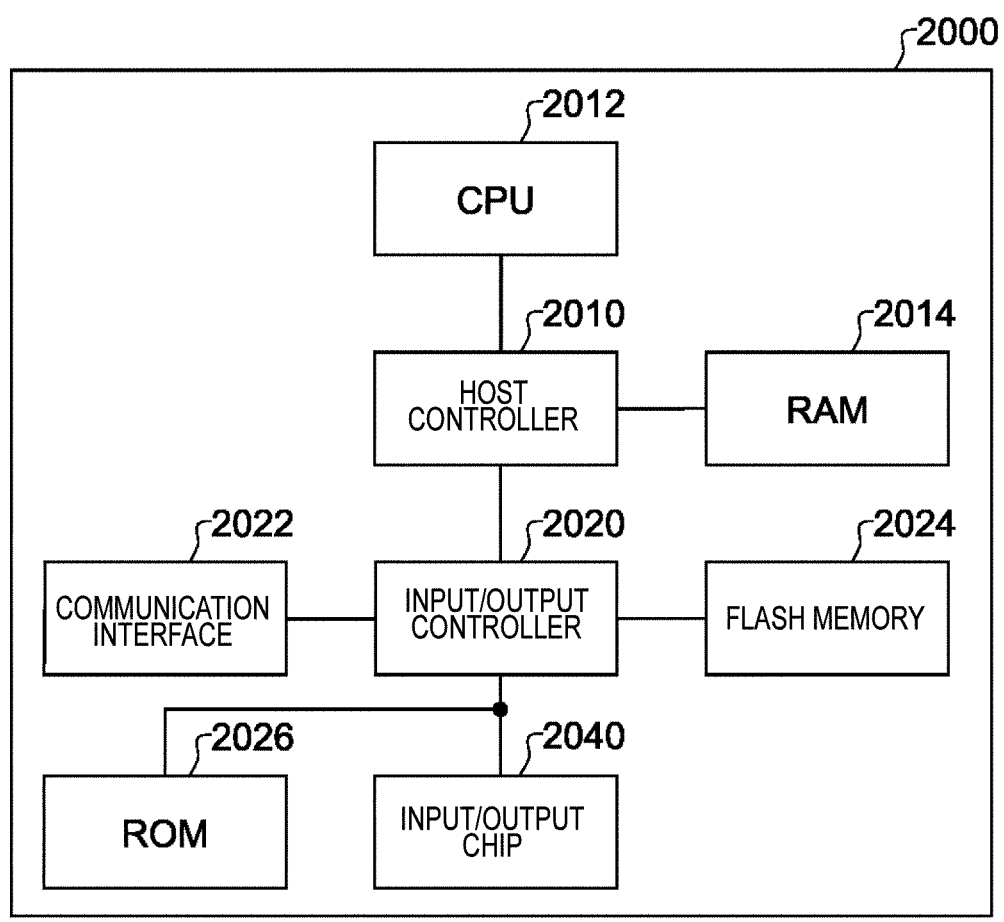
FIG. 9 shows an example of a computer 2000.

FIG. 9 shows an example of a computer 2000 in which a plurality of embodiments of the present invention may be entirely or partially embodied. Programs installed in the computer 2000 can cause the computer 2000 to: function as apparatuses such as the communication device 24 according to the embodiments, or each unit of the apparatuses; execute operations associated with the apparatuses or each unit of the apparatuses; and/or execute a process according to the embodiments or steps of the process. Such a program may be executed by a CPU 2012 to cause the computer 2000 to execute the specific operation associated with some or all of the blocks of processing procedures and block diagrams described in the present specification.

The computer 2000 according to the present embodiment includes the CPU 2012 and a RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, and an HDMI (registered trademark) port.

The program is provided via a network or a computer-readable medium such as a CD-ROM, a DVD-ROM, or a memory card. The RAM 2014, the ROM 2026, or the flash memory 2024 is an example of the computer-readable medium. The program is installed in the flash memory 2024, the RAM 2014, or the ROM 2026 and executed by the CPU 2012. Information processing written in these programs is read by the computer 2000, resulting in cooperation between a program and the above-described various types of hardware resources. An apparatus or method may be constituted by realizing the operation or processing of information in accordance with the usage of the computer 2000.

For example, when communication is executed between the computer 2000 and an external device, the CPU 2012 may execute a communication program loaded in the RAM 2014, and instruct the communication interface 2022 to process the communication based on the processing written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes reception data received from the network into a reception buffer processing area or the like provided on the recording medium.

In addition, the CPU 2012 may cause all or a necessary portion of a file or a database to be read into the RAM 2014, the file or the database having been stored in the recording medium such as the flash memory 2024, and execute various types of processing on the data on the RAM 2014. The CPU 2012, then, writes back the processed data into the recording medium.

Various types of information, such as various types of programs, data, tables, and databases, may be stored in the recording medium to undergo information processing. The CPU 2012 may execute, on the data read from the RAM 2014, various types of processing including various types of operations, processing of information, conditional judgment, conditional branching, unconditional branching, search and replacement of information, and the like described in the present specification and specified by instruction sequences of the programs, and writes a result back to the RAM 2014. The CPU 2012 may also search for information in a file, a database, and the like in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module described above may be stored in a computer-readable medium on the computer 2000 or near the computer 2000. A recording medium such as a hard disk or a RAM provided in a server system connected to a dedicated communication network or the Internet can be used as a computer-readable medium. The programs stored in the computer-readable medium may be provided to the computer 2000 via the network.

The program installed in the computer 2000 and causing the computer 2000 to function as the communication device 24 may instruct the CPU 2012 or the like to cause the computer 2000 to function as each unit of the communication device 24. The information processing written in these programs are read by the computer 2000 to cause the computer to function as each unit of the communication device 24, which is a specific means realized by the cooperation of software and the various types of hardware resources described above. Then, these specific means realize operations or processing of information corresponding to the intended use of the computer 2000 in this embodiment, so that the communication device 24 is constructed as a specific communication device corresponding to the intended use.

Various embodiments have been described with reference to the block diagrams and the like. In the block diagram, each block may represent (1) a step of a process in which an operation is performed, or (2) each unit of the apparatus having a role of performing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, a memory element such as a flip-flop, a register, a field programmable gate array (FPGA), and a programmable logic array (PLA), and the like.

The computer-readable medium may include any tangible device capable of storing an instruction to be executed by an appropriate device, so that the computer-readable medium having the instruction stored thereon constitutes at least a part of a product including an instruction that may be executed in order to provide means to execute an operation specified by a processing procedure or a block diagram. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), and C++, and conventional procedural programming languages, such as the "C" programming language or similar programming languages.

Computer-readable instructions may be provided to a processor of a general-purpose computer, special purpose computer, or other programmable data processing apparatuses, or to a programmable circuit, locally or via a local area network (LAN), wide area network (WAN) such as the Internet, etc., so that the computer-readable instructions are executed to create means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Explanation of References

10: warning system; 20: vehicle; 21: radar; 22: camera; 24: communication device; 25: GNSS reception unit; 26: vehicle velocity sensor; 29: sensor; 30: driver-assistance control apparatus; 50: roadway; 60: sidewalk; 80: pedestrian; 82: terminal; 100: vehicle; 200: processing unit; 210: target locating unit; 220: image acquisition unit; 222: extraction unit; 230: target distance acquisition unit; 240: target position calculation unit; 250: moving body positional information acquisition unit; 260: velocity calculation unit; 270: communication control unit; 280: storage unit; 290: transmission unit; 292: reception unit; 294: communication unit; 300: image; 310: object; 2000: computer; 2010: host controller; 2012: CPU; 2014: RAM; 2020: input/output controller; 2022: communication interface; 2024: flash memory; 2026: ROM; 2040: input/output chip

What is claimed is:

1. A communication device provided at a moving body, comprising:
   at least one processor; and
   a communication interface, wherein
   the at least one processor is configured to calculate and locate a position of a target having a risk of approaching the moving body,
   the communication interface is configured to transmit, to an external terminal positioned near the target, request information including information of the position of the located target, to request positional information of the external terminal, based on the position of the located target, and is configured to receive response information with respect to the request information, and
   wherein the communication interface is further configured to transmit warning information based on the positional information of the external terminal included in the response information.

2. The communication device according to claim 1, wherein
   the at least one processor is further configured to correct positional information of the target based on the positional information of the external terminal included in the response information, and
   the communication interface is further configured to transmit warning information including the positional information corrected by the at least one processor.

3. The communication device according to claim 1, wherein
   the at least one processor is further configured to determine whether to warn the target based on the positional information of the external terminal included in the response information, and
   the communication interface is configured to transmit the warning information when the at least one processor determines to warn the target.

4. The communication device according to claim 1, wherein
   the at least one processor is further configured to
   acquire positional information of the moving body,
   acquire an image capturing outside of the moving body,
   extract the target having the risk of approaching the moving body from the acquired image,
   acquire a distance to the extracted target, and
   calculate the position of the target having the risk of approaching the moving body based on the positional information of the moving body and the distance to the target.

5. The communication device according to claim 1, wherein
   the request information includes instruction information instructing the external terminal to perform repositioning of the positional information of the external terminal.

6. The communication device according to claim 1, wherein
   the response information includes address information of the external terminal.

7. The communication device according to claim 6, wherein
   the communication interface is further configured to transmit the warning information in which the address information is set as a destination.

8. The communication device according to claim 1, wherein
   the communication interface is further configured to transmit at least one of the warning information or the request information to the external terminal by direct communication.

9. The communication device according to claim 1, wherein
the communication interface is further configured to transmit at least one of the warning information or the request information by broadcast.

10. The communication device according to claim 4, wherein
the at least one processor is further configured to acquire the distance to the target using a radar installed in the moving body.

11. The communication device according to claim 4, wherein
the at least one processor is further configured to acquire the distance to the target based on the acquired image.

12. The communication device according to claim 1, wherein
the at least one processor is further configured to select a transmission method used by the communication interface to transmit at least one of the warning information or the request information, and select the transmission method based on at least one of a moving velocity of the target, a moving velocity of the moving body, or a relative velocity between the moving body and the target.

13. The communication device according to claim 1, wherein
the at least one processor is further configured to select a transmission method used by the communication interface to transmit at least one of the warning information or the request information, and select the transmission method based on a category of the target.

14. The communication device according to claim 12, wherein
the transmission method includes a first transmission method for transmitting at least one of the warning information or the request information at a first signal intensity, and a second transmission method for transmitting the at least one of the warning information or the request information at a second signal intensity different from the first signal intensity, and
a selection of the transmission method includes selecting one of the first transmission method or the second transmission method.

15. The communication device according to claim 12, wherein
the transmission method includes a first transmission method for transmitting at least one of the warning information or the request information to an external terminal associated with the target by unicast, and a second transmission method for transmitting the at least one of the warning information or the request information by broadcast, and
a selection of the transmission method includes selecting one of the first transmission method or the second transmission method.

16. The communication device according to claim 1, wherein
the target includes at least one of a person or a vehicle.

17. The communication device according to claim 1, wherein
the moving body is a vehicle.

18. A vehicle, comprising
the communication device according to claim 17.

19. A non-transitory computer-readable storage medium having recorded thereon a program that, when executed by a computer provided at a moving body, causes the computer to perform operation comprising:
calculating and locating a position of a target having a risk of approaching the moving body;
transmitting, to an external terminal positioned near the target, request information including information of the position of the located target, to request positional information of the external terminal, based on the position of the located target;
receiving response information with respect to the request information; and
transmitting warning information based on the positional information of the external terminal included in the response information.

20. A communication method, comprising:
calculating and locating, by a communication device provided at a moving body, a position of a target having a risk of approaching a moving body;
transmitting, by a communication device, to an external terminal positioned near the target, request information including information of the located position of the target, to request positional information of the external terminal, based on the located position of the target;
receiving, by a communication device, response information with respect to the request information; and
transmitting, by a communication device, warning information based on the positional information of the external terminal included in the response information.

21. The communication device according to claim 1, wherein
the external terminal does not transmit the response information when a distance between the position of the located target included in the request information a current position of the external terminal is larger than a predetermined value.

* * * * *